Figure 3:
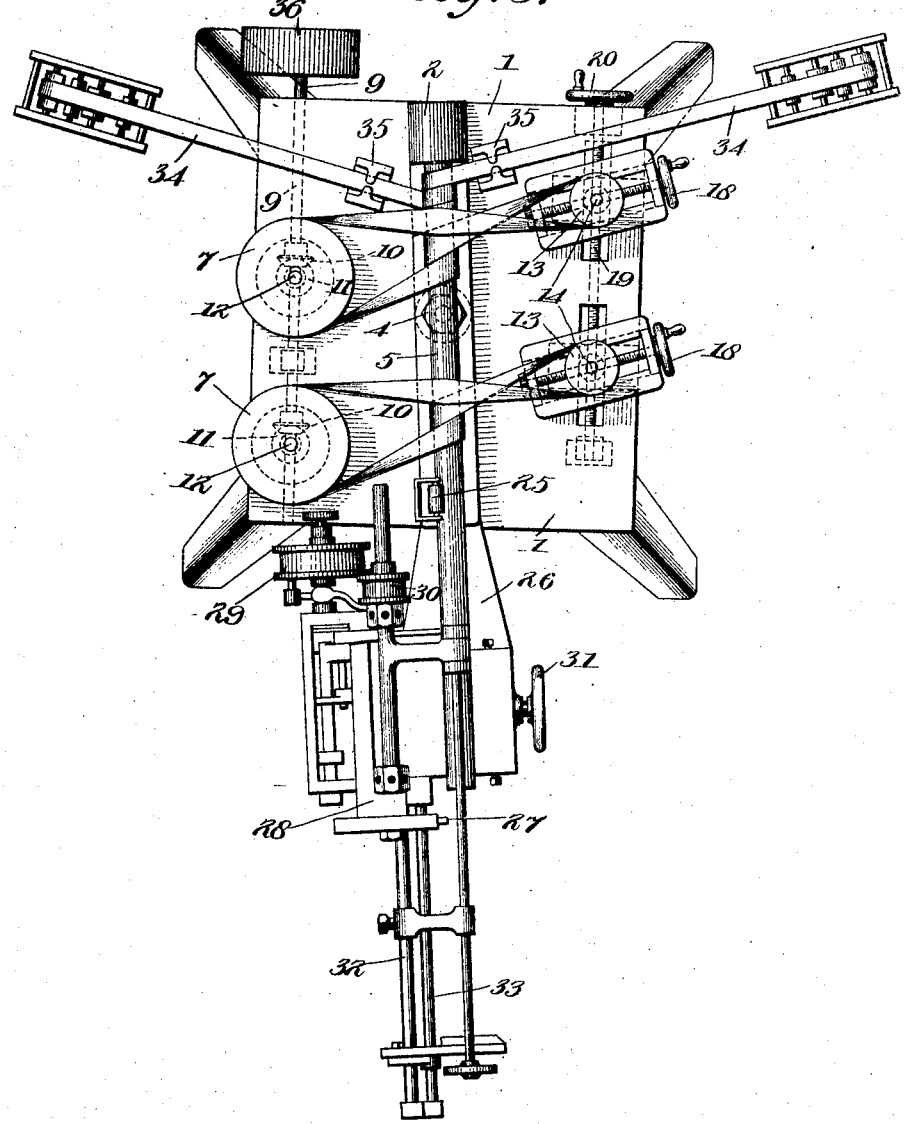

W. T. WILSON & A. B. STARR.
TUBE WINDING MACHINE.
APPLICATION FILED NOV. 23, 1910. RENEWED MAR. 9, 1912.
1,042,862.
Patented Oct. 29, 1912.
2 SHEETS—SHEET 1.
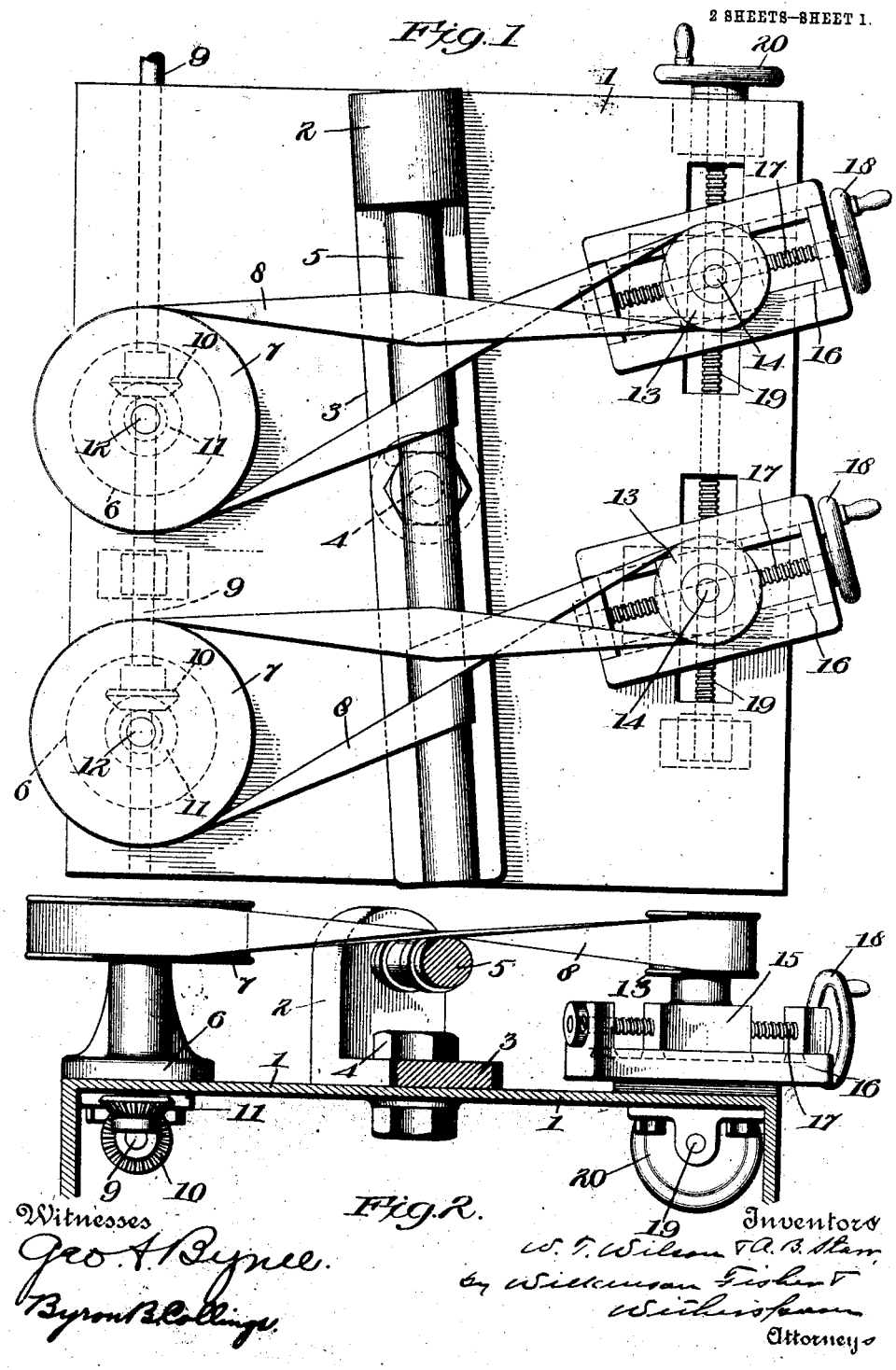

W. T. WILSON & A. B. STARR.
TUBE WINDING MACHINE.
APPLICATION FILED NOV. 23, 1910. RENEWED MAR. 9, 1912.

1,042,862.

Patented Oct. 29, 1912.

2 SHEETS—SHEET 2.

WITNESSES:
Chas. F. Clagett
Byron B. Collings

INVENTORS
W. T. Wilson & A. B. Starr
by Wilkinson Fisher &
Witherspoon
ATTORNEYS

UNITED STATES PATENT OFFICE.

WYLE T. WILSON, OF PHILADELPHIA, PENNSYLVANIA, AND ALDEN B. STARR, OF NEW YORK, N. Y., ASSIGNORS TO SINGLE SERVICE PACKAGE CORPORATION OF AMERICA, OF NEW YORK, N. Y., A CORPORATION OF NEW JERSEY.

TUBE-WINDING MACHINE.

1,042,862. Specification of Letters Patent. Patented Oct. 29, 1912.

Application filed November 23, 1910, Serial No. 593,906. Renewed March 9, 1912. Serial No. 682,758.

*To all whom it may concern:*

Be it known that we, WYLE T. WILSON and ALDEN B. STARR, both citizens of the United States, the former residing at Philadelphia, county of Philadelphia, State of Pennsylvania, the latter residing at New York, county of New York, State of New York, have invented certain new and useful Improvements in Tube-Winding Machines; and we do hereby declare the following to be a full, clear, and exact description of the invention, such as will enable others skilled in the art to which it appertains to make and use the same.

This invention relates to tube winding machines, and has for its object to produce a machine which will be more simple in construction, and one which will require less attention than those heretofore proposed.

To these ends the invention consists in the novel details of construction and combinations of parts more fully hereinafter disclosed and particularly pointed out in the claims.

Referring to the accompanying drawings forming a part of this specification in which like numerals refer to like parts in all the views:—Figure 1 is a plan view of a portion of a machine made in accordance with our invention with certain parts omitted which are shown in Fig. 3; Fig. 2 is a sectional view partly in elevation of the parts shown in Fig. 1; and, Fig. 3 is a plan view of the machine shown in Fig. 1 with the winding strips in position and also showing a cut-off mechanism.

As is well known, the tube winding machines in common use support the winding belts upon adjustable arms, in order to vary the angle between said belts and the mandrel, and when a given size of tube is being made, these cross arms are constantly getting out of order and giving a great deal of trouble in returning them to their proper adjustments. So long as tubes of a fixed diameter are to be made, however, there is no necessity for having the winding belts adjustable, and, therefore, if only one size of tube should be desired, the winding belts as well as the mandrel could be made practically non-adjustable, and therefore all the complicated power connections with the cross arms which are now employed, could be eliminated.

In the machine now to be described, we do away with the above complicated connections with the cross arms, and at the same time we provide for a limited adjustment which will enable the diameter of the tube to be varied within certain limits.

1 indicates any suitable base on which the machine is supported; and 2 the head for the mandrel rigid with the extension 3 which is pivoted at 4 to the base 1. The mandrel 5 is also rigid with the head 2, so that when the pivot 4 is fixed, the said mandrel remains fixed.

6 represents standards secured to the base 1 and carrying the pulleys 7 for the winding belts 8, as shown.

9 represents a power shaft provided with the gears 10 engaging the gears 11 carried by the shafts 12 of the pulleys, which are fixed as shown to the base plate 1.

The belts 8 pass around the mandrel 5 in the usual manner, and also around the pulleys 13 carried by the shafts 14, supported in the blocks 15 adapted to slide in the ways 16 and adjustable in said ways by means of the screws 17 and hand wheels 18. A screw 19 passes through an extension of said ways at an angle to the screws 17, and through the hand wheel 20 adjusts said blocks 15 as well as the slide ways 16 longitudinally of the mandrel as will be readily understood.

From the mechanism so far disclosed, it is evident that by loosening the pivot 4 the mandrel 5 can be adjusted around said pivot and that by operating the hand wheel 20 the belts can be correspondingly adjusted, while by operating the hand wheels 18, said belts can be tightened or loosened as may be desired.

In practice, as shown in Fig. 3, the mandrel extends some distance beyond the base 1 and is preferably provided with a roller device 25 for supporting its end portion beyond the belts. Also attached to said base 1 is a supporting plate 26 for the cut-off mechanism which in this instance may consist of a saw 27 supported by a carriage 28 and receiving power through the pulleys 29 and 30 in a manner well known.

31 represents a means for adjusting the cut-off mechanism, and 32 and 33 represent rods upon which certain portions of said mechanism slide. Since the said cut-off mechanism forms no part of the present invention, it is not herein more fully disclosed.

34 represents the usual paper strips which are fed to the mandrel through the guides 35, and 36 represents a pulley for applying power to the shaft 9.

It is evident from the mechanism now disclosed that tubes of a fixed diameter and employing strips 34 of a uniform width may be wound upon the mandrel 5. It is further evident that should it be desired to vary the widths of the strips 34 as well as the diameter of the tubes within limits, that the adjustment of the pulleys 13 and of the mandrel around its pivot 4 will provide for such variations, and yet the complicated connections between the pulleys 7 and the power that have been heretofore used are not employed. Further it will be observed that the fixed pulleys 7 are of a much larger diameter than the pulleys 13, and it results from this, that the said pulleys 7 provide a much greater frictional or driving surface for the winding belts 8 than do the pulleys 13. In fact, in those cases where it is desirable to do so, the fixed pulleys 7 are made sufficiently large to entirely drive the belts 8, so that substantially the whole friction involved exists between said pulleys and the belts, and between one side of the mandrel and the belts. In such cases the pulleys 13 become little more than mere guides, and consequently their easy and ready adjustment is greatly facilitated. In other words, a construction embodying the features illustrated in Fig. 1, for example, constitutes a machine of great simplicity, one requiring much less attention than those employing pulleys 7 and 13 of equal size, and also one which is capable of making tubes of sizes differing sufficiently for a large number of purposes. While in such a machine the pulleys 7 take up considerable space on one side of the mandrel, the pulleys 13 are so small on the other side that all the necessary room for manipulating the paper is provided. It should also be observed that the pivot 4 being located in a vertical plane passing between the belts, the strains tending to swing said mandrel on said pivot are neutralized, which would not be the case if said pivot were located to one side of said belts. It will be further observed that the entire adjustment of the belts may be obtained from the swiveled mandrel when desired by loosening the pivotal bolt 4 and suitably adjusting the mandrel. In such case the longitudinal adjusting screw 19 need not be used and therefore could be omitted, thus still further simplifying the machine.

Since those skilled in the art may vary the arrangement of parts and the details of construction without departing from the spirit of our invention, we do not wish to be limited to such features except as may be required by the claims.

What we claim is:—

1. In a tube winding machine the combination of a base; a pulley fixed to said base; a shaft and connection for transmitting power to said pulley; a mandrel provided with a rigid extension pivotally secured to said base; a winding belt passing around said mandrel and pulley; an adjustable pulley around which said belt also passes; and means for adjusting said last named pulley longitudinally of said mandrel, substantially as described.

2. In a tube winding machine the combination of a base; a pulley fixed to said base; a shaft and connections for transmitting power to said pulley; a mandrel carried by said base; pivotal means for fixedly securing said mandrel to said base; a winding belt passing around said mandrel and pulley; an adjustable pulley around which said belt also passes; and means for adjusting said last named pulley longitudinally of said mandrel, substantially as described.

3. In a tube winding machine the combination of a base; a pulley fixed to said base; a shaft and connections for transmitting power to said pulley; a mandrel having a rigid extension pivotally secured to said base; a winding belt passing around said mandrel and pulley; an adjustable pulley around which said belt also passes; means for tightening said belt; means to support said mandrel outside of said belt; and means for adjusting said last named pulley longitudinally of said mandrel, substantially as described.

4. In a tube winding machine the combination of a base; a plurality of pulleys fixed to said base; a shaft and connections for transmitting power to said pulleys; a mandrel pivotally fixed to said base; belt tightening pulleys carried by said base; means to adjust said tightening pulleys to and from said mandrel; means to adjust said pulleys longitudinally of said mandrel; belts passing around each of said pulleys and said mandrel; and a support outside of said belts for said mandrel, substantially as described.

5. In a tube winding machine the combination of a mandrel head; an extension rigid with said head; a mandrel rigid with said head and extending substantially parallel with said extension; a supporting base; a pair of belts passing around said mandrel; and pivoting means located between said belts and substantially at the longitudinal center of said base for fixing said extension and mandrel to said base, substantially as described.

6. In a tube winding machine the combination of a base; a pair of pulleys mounted on said base, one of which is larger than the other and the larger pulley being fixed to said base; a mandrel having a rigid extension carried by said base; a pivotal connection between said extension and said base; and a belt passing around said pulleys and mandrel, substantially as described.

7. In a tube winding machine the combination of a base; a plurality of pulleys mounted on said base; a mandrel supported on said base; a pivotal connection between said mandrel support and said base; a belt passing around said pulleys and mandrel on each side of said connection, and means for tightening said belts, substantially as described.

8. In a tube winding machine the combination of a base; a plurality of pulleys mounted on said base, one of which is fixed and one of which is movable; a mandrel having an extension rigid therewith; a pivot passing through said extension and base on which said mandrel is swiveled; and belts passing around said pulleys and mandrel on each side of said pivot, substantially as described.

9. In a tube winding machine, the combination of a mandrel head; an extension rigid with said head; a mandrel rigid with said head and extending substantially parallel with said extension; a supporting base and pivoting means for fixing said extension and mandrel to said base; a plurality of pulleys of different sizes mounted on said base; a shaft and connections for transmitting power to the pulleys on one side of said mandrel; belts passing around said pulleys and said mandrel; and means to adjust the smaller of said pulleys to and from said mandrel, substantially as described.

10. In a tube winding machine the combination of a base; a plurality of driving pulleys fixed to said base; a plurality of adjustable pulleys coöperating with said driving pulleys and of a smaller size than said driving pulleys; a mandrel carried by said base; means for fixing said mandrel to or adjusting the same at will with relation to said base; and belts passing around said pulleys and mandrel, substantially as described.

In testimony whereof, we affix our signatures, in presence of two witnesses.

WYLE T. WILSON.
ALDEN B. STARR.

Witnesses:
J. H. GEWECKE,
H. S. RODGERS.